US008279802B1

(12) United States Patent
Singh

(10) Patent No.: US 8,279,802 B1
(45) Date of Patent: Oct. 2, 2012

(54) CELLULAR-TELEPHONE-BASED SERVERS

(76) Inventor: Gurminder Singh, Cupertino, CA (US)

( * ) Notice: Subject to any disclaimer, the term of this patent is extended or adjusted under 35 U.S.C. 154(b) by 516 days.

(21) Appl. No.: 12/477,103

(22) Filed: Jun. 2, 2009

Related U.S. Application Data

(60) Provisional application No. 61/058,871, filed on Jun. 4, 2008.

(51) Int. Cl.
*H04W 4/00* (2009.01)
(52) U.S. Cl. ......... 370/328; 709/217; 709/218; 709/219
(58) Field of Classification Search .......... 370/310–350; 455/422.1–466
See application file for complete search history.

(56) References Cited

U.S. PATENT DOCUMENTS

| | | | |
|---|---|---|---|
| 7,298,714 B2 | 11/2007 | Foster | |
| 7,298,833 B2 | 11/2007 | Klein et al. | |
| 7,315,747 B2 | 1/2008 | Klassen et al. | |
| 7,359,699 B2 | 4/2008 | Rajaram | |
| 7,362,745 B1 | 4/2008 | Cope et al. | |
| 2001/0014085 A1* | 8/2001 | Johansson et al. | 370/329 |
| 2005/0147049 A1* | 7/2005 | Ganesan | 370/241 |
| 2006/0001737 A1 | 1/2006 | Dawson et al. | |
| 2006/0150152 A1* | 7/2006 | Soini et al. | 717/116 |
| 2007/0149256 A1* | 6/2007 | Burgan et al. | 455/574 |
| 2007/0173297 A1* | 7/2007 | Cho et al. | 455/574 |
| 2007/0249373 A1* | 10/2007 | Beard et al. | 455/466 |
| 2008/0248834 A1* | 10/2008 | Chatterjee et al. | 455/557 |

OTHER PUBLICATIONS

Wikman et al, Providing HTTP Access to Web Servers Running on Mobile Phones, Nokia Research Center, NCR-TR-2006-005, May 2006.*
Wikman, et al, Personal Website on a Mobile Phone, Nokia Research Center, NRC-TR-2006-004, May 2006.*
"About Qik (pronounced "quick")", [online]. Qik, Inc. [retrieved on Jun. 10, 2008], <URL: http://qik.com/info/about_us>.
"Frequently Asked Questions", [online]. Qik, Inc. [retrieved on Jun. 10, 2008], <URL: http://qik.com/info/faq>.
Singh, U.S. Appl. No. 61/074,866, filed Jun. 23, 2008.
Singh, U.S. Appl. No. 12/489,310, filed Jun. 22, 2009.
Singh, U.S. Appl. No. 61/091,690, filed Aug. 25, 2008.
Singh, U.S. Appl. No. 12/546,580, filed Aug. 24, 2009.

* cited by examiner

*Primary Examiner* — Charles C Jiang
(74) *Attorney, Agent, or Firm* — Treyz Law Group; David C. Kellogg

(57) ABSTRACT

Cellular-telephone-based servers are provided that have reduced power consumption. When a cellular-telephone-based server is active, the server may maintain an Internet Protocol (IP) link with a communications network. When no users are connected to the server or at other appropriate times, the cellular-telephone-based server may enter a hibernation state to reduce power consumption. In the hibernation state, the cellular telephone that is running the server may maintain a communications link that supports short messaging service (SMS) messaging and may maintain a communications link associated with control channels that convey control data for cellular telephone communications. A user wishing to connect to the server may send an SMS address request to the server to obtain its IP address. If the server is hibernating, a service controller can activate the server before responding to the SMS address request.

3 Claims, 4 Drawing Sheets

CELLULAR-TELEPHONE-BASED SERVERS

This application claims the benefit of provisional patent application No. 61/058,871, filed Jun. 4, 2008, which is hereby incorporated by reference herein in its entirety.

BACKGROUND OF THE INVENTION

This invention relates generally to cellular telephones, and more particularly, to servers implemented on cellular telephones.

Cellular telephones and other portable electronic devices are becoming increasingly powerful and typically have significant processing, memory, wireless communication, and storage resources. These resources can be substantial enough to run servers such as web servers and media servers. Unless care is taken to consume power wisely when running servers on cellular telephones, however, the cellular telephones may exhibit unacceptably short operating times.

It would therefore be desirable to be able to provide cellular-telephone-based servers that exhibit modest power consumption.

SUMMARY OF THE INVENTION

Cellular-telephone-based servers are provided that have reduced power consumption. When the cellular-telephone-based servers are active, the servers may maintain an IP data link with a communications network. When no users are connected to the servers or at other appropriate times, the cellular-telephone-based servers may enter a hibernation state to reduce power consumption.

In the hibernation state, a cellular telephone that runs a server may maintain a cellular telephone communications link that supports SMS messaging and may turn off the server and its associated IP data link. When a user wishes to connect to the server, the user may send a SMS-based IP address request to the server to obtain its IP address. If the server is hibernating, a service controller can activate the server before responding to the SMS address request by providing the requester with its IP address.

The cellular-telephone-based servers may be used in systems with multiple communications networks. In these systems, a service portal may be used in connecting devices in separate communications networks. For example, a service portal may act as a device on each of the networks and may forward requests for service and responses to those requests between a client device on a first network and a cellular-telephone-based server device on a second network.

Further features of the invention, its nature and various advantages will be more apparent from the accompanying drawings and the following detailed description of the preferred embodiments.

DETAILED DESCRIPTION

Figure 1:
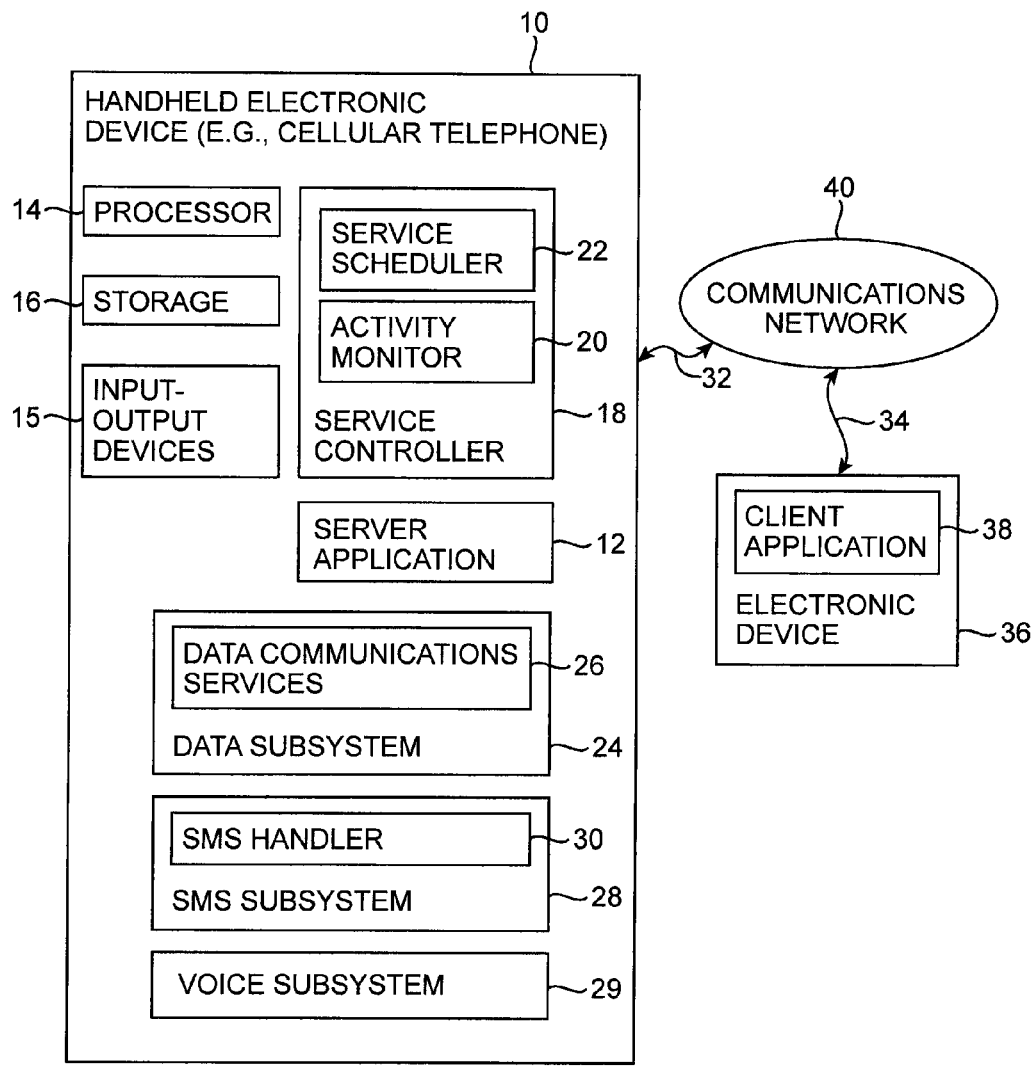
FIG. 1 is a diagram of an illustrative cellular-telephone-based server system in accordance with an embodiment of the present invention.

This invention relates generally to cellular telephones, and more particularly, to cellular-telephone-based servers. Cellular-telephone-based servers can be used to enable cellular telephone users to share media with users of other electronic devices without relying on centralized media sharing servers.

Cellular-telephone-based servers may be implemented using computer software programs (sometimes referred to as server applications) with which client applications associated with remote users can connect and request data or services. Examples of servers (e.g., server applications) that can be run on cellular telephones include web servers, database servers, application servers, media servers, and combinations of these and other servers. With one suitable arrangement, the cellular-telephone-based servers may be media servers that facilitate the exchange of media files such as pictures.

In conventional server systems, servers are run continuously. Servers that run continuously will continuously consume power for processors, memory and storage devices, and, in wireless server systems, wireless communications devices such as radios that connect to wireless data networks. When these conventional servers are implemented on cellular telephones, which typically have a limited battery capacity, the cellular telephones may exhibit unacceptably short operating times.

In accordance with the present invention, cellular-telephone-based servers are provided which enter hibernation states at appropriate times so that the power consumption of the cellular-telephone-based servers is reduced. With one suitable arrangement, a cellular-telephone-based server may enter its hibernation state if the server does not receive a request for data or services within a user-configurable period of time. A cellular-telephone-based server may also enter its hibernation state at any other suitable time such as when a battery voltage drops below a critical value, when a user presses a button or otherwise directs the server to enter its hibernation state, at a prescheduled time set by the user, when other hibernation criteria are satisfied, etc.

When cellular-telephone-based servers are in a hibernation state, the power consumption of the servers may be substantially reduced relative to when the servers are active. For example, when a server is hibernating, radio-frequency transceiver circuitry that provides a connection to a wireless data network when the server is active may be partly or fully turned off and associated processor resources may be freed (which can reduce power consumption).

Because a cellular-telephone-based server that is in its hibernation state has generally shut down at least some of its wireless data connection resources, the server should be activated before a client connects to the server. With one suitable arrangement, an external trigger may be used to activate the server to start serving clients. A separate low-power data communications channel (e.g., a communications path that may be separate from the wireless data connection used when the server is active) may be used to receive the external trigger. For example, the external trigger may be received using short message service (SMS) communications protocols, as SMS communications protocols are typically optimized to minimize power consumption and are generally supported by a wide range of devices and networks. With one suitable arrangement, the trigger may be received through control channels that are used for transferring control data to cellular telephones. The server may also be activated using other triggers such as internal triggers that are generated in response to a schedule and triggers that are generated in response to user input. These are merely illustrative examples. In general, any suitable trigger such as a wireless or non-wireless trigger may be used to activate server functionality.

When a cellular-telephone-based server is activated, the server may connect to a wireless data network and obtain an address such as an internet protocol (IP) address. With one arrangement, if the server was activated after receiving an external trigger, the server may send a confirmation message to the source of the external trigger that indicates that the server is now active and that include the server's IP address. For example, when a server receives an SMS trigger from a client device requesting service from the server, the server may activate, connect to a wireless data network, obtain an IP address, and send a confirmation SMS message to the requester (i.e., the client device) that indicates that the server is active and that includes the server's IP address.

An illustrative cellular-telephone-based server system is shown in FIG. 1. In the system of FIG. 1, user devices such as device 10 that implement a cellular-telephone-based server and other electronic devices (e.g., devices such as device 36, which are sometimes referred to as client devices) can communicate over a communications network 40. The user devices may communicate by exchanging digital information such as text, graphics, audio, video, commands, executable code, data, etc.

Electronic device 36, which is sometimes referred to herein as a client device, may connect to a server in device 10. Electronic device 36 may have a client application 38 that communicates through communications paths 34 and 32 (e.g., wired or wireless paths associated with network 40) and other resources in network 40 to connect to device 10 and access the services provided by a server in device 10 (e.g., download pictures, access a database, run applications from an application server, etc.). Electronic device 36 may be any suitable electronic device including another device that implements a cellular-telephone-based server (e.g., another device 10), a portable electronic device such as a cellular telephone, a laptop computer, a portable computer, an Internet-enabled television or set-top box, a desktop computer, a media player with wired or wireless communications capabilities, etc.

As shown in FIG. 1, device 10 may be a cellular telephone device having processor 14, storage 16, and wireless communications systems such as data subsystem 24, short message service SMS subsystem 28, and voice subsystem 29.

Storage 16 may include one or more different types of storage such as hard disk drive storage, nonvolatile memory (e.g., flash memory or other electrically-programmable-read-only memory), volatile memory (e.g., battery-powered static or dynamic random-access-memory), etc.

Processor 14 may be based on a processor such as a microprocessor and other suitable integrated circuits. With one suitable arrangement, processing circuitry 14 and storage 16 are used to run software on device 10 such as server application 12 and service controller 18. Processing circuitry 14 and storage 16 may be used in implementing suitable communications protocols such as internet protocols, wireless local area network protocols (e.g., IEEE 802.11 protocols), protocols for other short-range wireless communications links such as the Bluetooth® protocol, protocols for handling 3 G communications services (e.g., using wide band code division multiple access techniques), 2G cellular telephone communications protocols, short message service (SMS) protocols, etc.

Device 10 may have input-output devices 15 that allow data to be provided to device 10 from external devices and that allow data to be supplied from device 10 to external devices. Input-output devices 15 can include user input-output devices such as buttons, touch pads, key pads, keyboards, cameras, microphones, etc. A user can control the operation of device 10 by supplying commands through input-output devices 15. A user may use input-output devices 15 to load media content onto device 10 (e.g., by taking pictures using an integrated camera).

Wireless communications systems such as data subsystem 24, SMS subsystem 28, and voice subsystem 29 may include communications circuitry such as radio-frequency (RF) transceiver circuitry formed from one or more integrated circuits, antennas, and other circuitry for handling RF wireless signals. With one suitable arrangement, device 10 may have a single radio-frequency transceiver that supports voice-based communications and data-based communications. With this arrangement, when server 12 is hibernating, the single transceiver may operate in a low-power mode in which data-based communications are disabled. With another suitable arrangement, device 10 may have separate transceivers one of which supports voice-based communications and one of which supports data-based communications. In this arrangement, the transceiver that supports data-based communications may be turned off when server 12 is hibernating.

SMS subsystem 28 may include SMS handler 30. SMS handler 30 may handle communications associated with SMS messages. SMS (short message service) messages may be, for example, text messages. With one suitable arrangement, SMS handler 30 may provide a low-power data communications channel that can be used to receive external service requests or triggers that activate server application 12 when server application 12 is not active. SMS subsystem 28 and SMS handler 30 may handle communications that occur over a wireless path such as path 32 to network 40.

Voice subsystem 29 may handle communications associated with telephone calls. Voice subsystem 29 may handle communications that occur over a wireless path such as path 32 to network 40. If desired, voice subsystem 29 and SMS subsystem 28 may be integrated together.

Data subsystem 24 may include data communications services 26. Data communications services 26 may handle communications associated with data communications such as data associated with internet protocol links (e.g., data related to web browsing or providing a web server), media uploads, and media downloads. With one suitable arrangement, when server application 12 is active, data communications services 26 and data subsystem 24 may handle data communications associated with a wireless IP (Internet Protocol) link over path 32 to communications network 40 and with providing service to a client device such as electronic device 36 (i.e., through network 40).

Server application 12 may be, for example, server software that is run by processor 14 and that is stored in storage 16. The server application 12 may be used in implementing a cellular-telephone-based server. For example, when the cellular-telephone-based server on device 10 is active, server application 12 may maintain a wireless IP link over path 32 with communications network 40 using data communications services 24. Server application 12 may facilitate the delivery of services to a client device 36. For example, server application 12 may provide a list of shared media files that may be accessed by client devices 36 and may coordinate the delivery of shared media files to client devices 36 that have requested access to these media files.

Service controller 18 may include activity monitor 20 and service scheduler 22. Service controller 18 may receive signals from input-output devices 15 such as user-generated service triggers. With SMS handler 30, service controller 18 may receive external service triggers (e.g., service requests from client device 36). If desired, service controller 18 may be implemented using software that runs on processor 14.

When appropriate, service controller 18 may place server application 12 in hibernation (e.g., controller 18 may turn off server application 12 and shut down data communications services 26 that are associated with server application 12). For example, service controller 18 may place server application 12 into a hibernation state when activity monitor 20 detects that the cellular-telephone-based server has been inactive for a user-configurable period of time. Service controller 12 may also place server application 12 in hibernation when appropriate signals are received using data communications services 26 or SMS handler 30 (e.g., signals from a client device 36 indicating that service from server application 12 is no longer needed). If desired, server 12 may be deactivated in response to a command from a user (e.g., a command receiving using input-output devices 15).

Service controller 18 may activate server application 12 when appropriate. For example, service controller 18 may activate server application 12 when SMS handler 30 receives a service or address request from a client device 36, when a user provides appropriate input through input-output devices 15, or when a scheduled service time (wake-up time) is reached as indicated by service scheduler 22.

Figure 2:
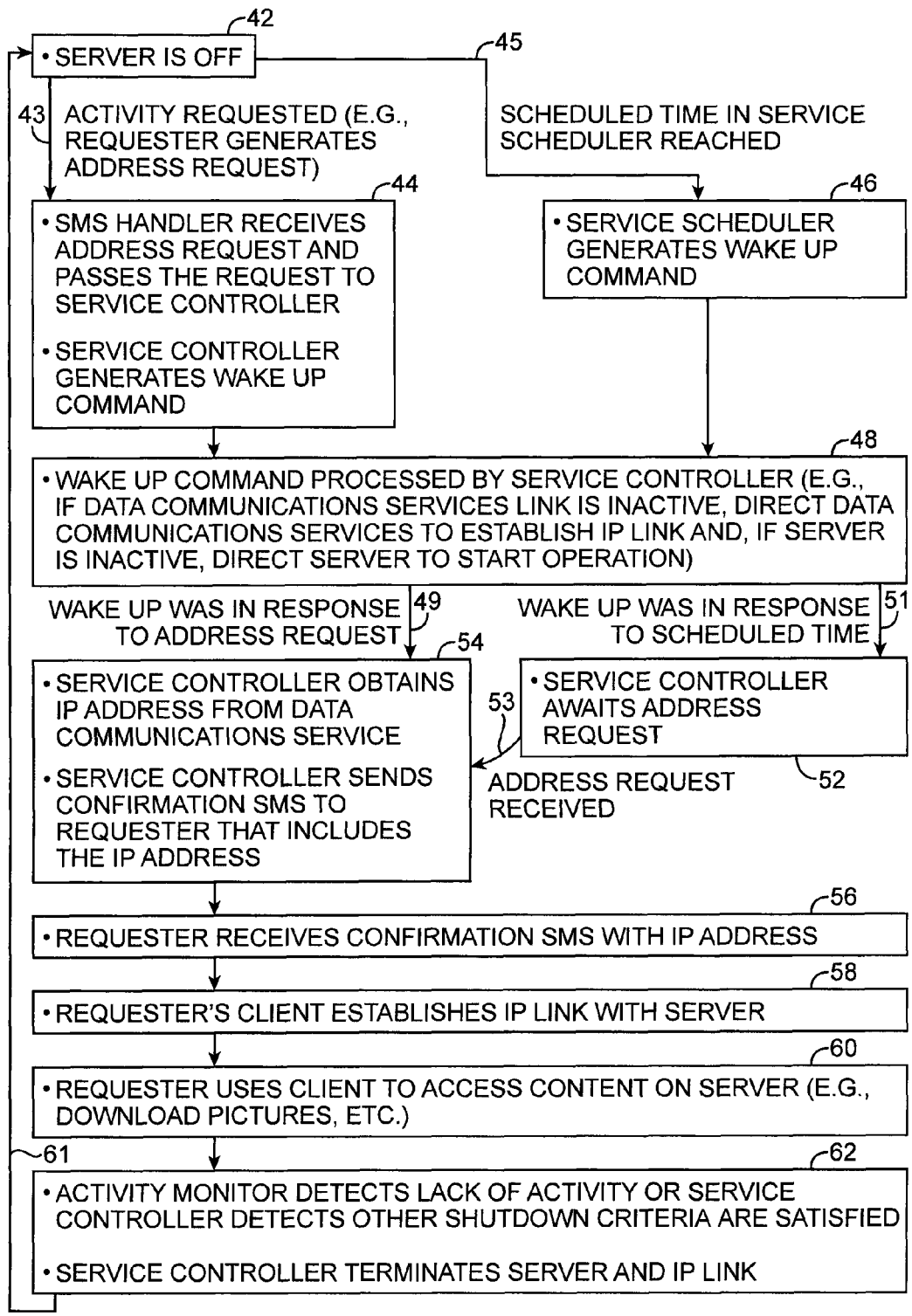
FIG. 2 is a flow chart of illustrative steps involved in using cellular-telephone-based servers in accordance with an embodiment of the present invention.

Illustrative steps involved in using a cellular-telephone-based server are shown in FIG. 2. Initially, server application 12 (e.g., a cellular-telephone-based server) may be in hibernation (step 42). Server application 12 may be placed in hibernation (i.e., turned off) to reduce power consumption and thereby increase the amount of time device 10 may operate using its battery power. When server application 12 is hibernating, an IP link or data communications link associated with server application 12 may be turned off. For example, a radio-frequency transceiver in data subsystem 24 that operates in a wireless communications band for data communications may be shut off or its power consumption reduced due to the absence of IP traffic.

During step 42, a radio-frequency transceiver may remain active so that device 10 can receive incoming cellular telephone calls and SMS messages. For example, one or more radio-frequency transceivers associated with voice subsystem 29 and/or SMS subsystem 28 may remain active during step 42.

When a requester (i.e., a client device 36) desires to connect to the cellular-telephone-based server on device 10, the requester may generate an address request as indicated by line 43. The address request may be sent by the requester to device 10 using the short messaging system (SMS) protocol.

At step 44, SMS handler 30 may receive the address request from the requestor (i.e., a device 36) and may convey the address request to service controller 18. When service controller 18 receives the address request, the service controller may generate a wake up command to activate server 12.

Device 10 may also activate server 12 at a prescheduled time, as illustrated by line 45. Service scheduler 22 may maintain a record of prescheduled times that server 12 should be activated and may provide a wake up command to service controller 18 when appropriate. With this type of arrangement, server application 12 may be activated (e.g., in step 46) when one of the prescheduled times is reached. With another suitable arrangement, service scheduler 22 may receive user input from input-output devices 15 in real time indicating that the server application 12 should be activated and may generate a wake up command at step 46 after receiving such user input.

At step 48, service controller 18 may receive the wake up command and may process the wake up command by activating server application 12 and directing data communications services 26 to establish an IP communications link with network 40 if necessary. If desired, service controller 18 may reset an inactivity timer in activity monitor 20 as part of activating server application 12.

As illustrated by line 49, if server 12 was activated in response to an address request from requester 36, device 10 may perform the operations of step 54.

As illustrated by line 51, when server 12 was activated by service scheduler 22 because a scheduled wake up time was reached or user input to activate server 12 was received, device 10 may actively listen for an address request from a requester at step 52. If no address request is received after a certain period of time, activity monitor 20 may direct service controller 18 to shut down server 12 (e.g., to place server 12 in hibernation and return to step 42). As illustrated by line 53, when device 10 receives an address request, device 10 may perform the operations of step 54.

At step 54, service controller 18 can obtain the IP address of device 10 from data communications services 26. The IP address may be the current IP address of device 10 that is associated with the IP communications link between device 10 and network 40. Service controller 18 may send a confirmation SMS to requester 36 using SMS handler 30. The confirmation SMS may include the IP address of device 10 (i.e., the IP address associated with server application 12) and may indicate that the server application 12 is active. If desired, the confirmation SMS may also indicate how long the server application 12 will remain active before hibernating (e.g., how long the server will remain active in the absence of activity or when a scheduled service period ends).

At step 56, client application 38 at requester 36 may receive the confirmation SMS that includes the IP address of device 10.

At step 58, the client application 38 of requester 36 may establish an internet protocol (IP) link with server application 12 of device 10 using the received IP address.

At step 60, a user at requester device 36, or a software program running on device 36, may use client application 38 to access content on server application 12. If desired, when connected to server application 12, client application 38 may download media files such as pictures, audio, and video from a media server, run applications from an application server, access a database server, or access other suitable content or services provided by server 12.

At step 62, service controller 18 may decide to place server 12 in hibernation. Service controller 18 may place server 12 in hibernation when activity monitor 20 detects that no activity has occurred for a user-configurable period of time, when requester device 36 indicates that the services of server 12 are no longer needed, when service scheduler 22 indicates that the scheduled service period has ended and that server 12 should not be kept active, when a user provides user input to turn off server 12, or for any other suitable reason. When service scheduler 22 indicates that a scheduled service period has ended, server 12 may, if desired, only be shut down in situations in which there are no client devices that are actively accessing server 12.

When service controller 18 places server 12 in hibernation at step 62, the service controller may terminate server application 12. This may reduce the activity level associated with processor 14 thereby reduce power consumption. Power consumption may also be reduced by terminating the wireless IP link that was maintained by data communications services 26 while server 12 was active. As illustrated by line 61, after placing server 12 in hibernation (i.e., terminating the server application), device 10 may return to the operations of step 42.

Figure 3:
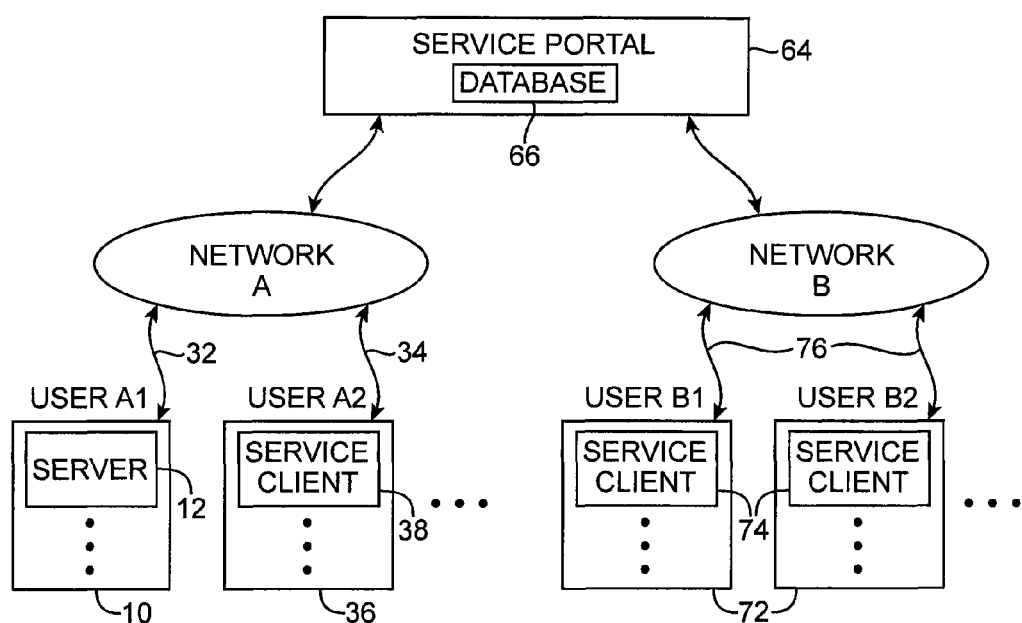
FIG. 3 is a diagram of an illustrative cellular-telephone-based server system having an illustrative service portal that bridges two networks in accordance with an embodiment of the present invention.

As shown in FIG. 3, device 10 may be used in a system with multiple networks such as network A and network B that are not directly connected. For example, networks A and B may be cellular telephone networks of competing service providers.

In an arrangement of the type shown in FIG. 3, a service portal 64 may be provided that bridges two networks (i.e., networks A and B). With one suitable arrangement, service portal 64 may act as a bridge or tunnel between a device on network A and a device on network B so that the two devices are connected together. With another suitable arrangement, service portal 64 may forward data between devices that are not on the same network. For example, service portal 64 may receive a request from a client application (i.e., service client 74) on a device in network B, download data from a cellular-telephone-based server on device 10 in network A based on the request, and then forward the downloaded data to the requester in network B.

Service portal 64 may maintain a database 66 of active servers such as active cellular-telephone-based servers and other servers. Database 66 may include a list of some or all of the cellular-telephone-based server devices and client devices, if desired. With one suitable arrangement, database may include a list of currently active cellular-telephone-based servers and their associated IP addresses and a list of currently inactive cellular-telephone-based servers and their associated telephone numbers (or other suitable identifiers).

Multiple users may be connected to network A and multiple users may be connected to network B. User devices in network A such as devices 36 with service clients 38 (i.e., client applications) may connect to network A over communications paths such as path 34. User devices in network B such as devices 72 with service clients 74 (i.e., client applications) 38 may connect to network B over communications paths 76. Each device 72 may be implemented using any suitable electronic device (e.g., another device 10, another device 36, a cellular telephone, a web-connected television, etc.).

Figure 4:
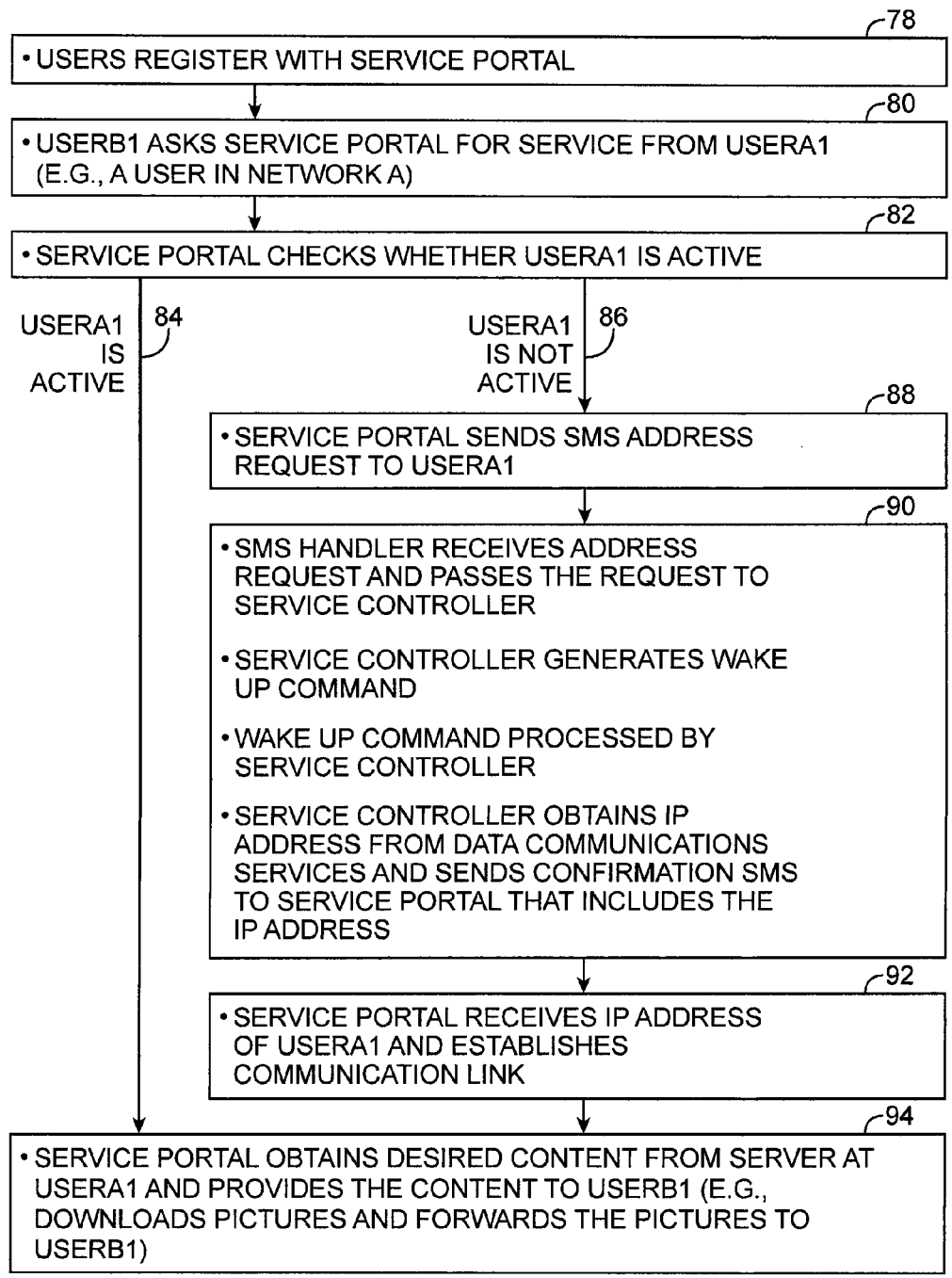
FIG. 4 is a flow chart of illustrative steps involved in using cellular-telephone-based servers in a system of the type shown in FIG. 3 in accordance with an embodiment of the present invention.

FIG. 4 shows illustrative steps involved in using a cellular-telephone-based server in a system of the type shown in FIG. 3.

At step 78, users in the system may register with service portal 64. Users may register using any suitable method. For example, as part of installing or configuring server 12, server 12 may send a message to service portal 64 indicating that server 12 has been installed or configured on device 10 and that device 10 has server capabilities. If desired, device 10 may send a message to service portal 64 when device 10 is first connected to network A or each time device 10 connects to network A. The message may include the telephone number of device 10 so that service portal 64 can send SMS-based address or service requests. Service portal 64 may store the telephone numbers of devices such as device 10 with cellular-telephone-based servers in database 66. If desired, client devices such as devices 36 and 72 may also send a message to service portal 64 when installing, configuring, or operating service clients such as clients 38 and 78 or when connecting to a network such as networks A or B to indicate that the client devices have the capability to access servers.

The steps of FIG. 4 may be used when a client device desires to connect to a cellular-telephone-based server in a separate network (e.g., when a client device in network B is connecting to a server device 10 in network A). When the client device and server device are in the same network, the steps of either FIG. 2 or 4 may be performed or a combination of the steps of FIGS. 2 and 4 may be performed.

In general, the steps of FIG. 4 may be combined with appropriate steps from FIG. 2. For example, steps in FIG. 2 related to placing server 12 in hibernation may be used when operating in a system of the type shown in FIG. 3.

At step 80, a user in network B such as user B1 may send a message to service portal 64 asking for service from a server in network A such as server 12 on device 10. This request for service may be an address request, a request to connect to server 12 or, if desired, may be a more specific request such as a request for the list of available services provided by server 12, a request to download specific files, etc. If user B1 is not already linked to portal 64, portal 64 may establish an IP link with user B1.

At step 82, service portal 64 may check whether the server 12 for which service was requested in step 80 is active. Service portal 64 can check whether the server is active by referencing a record of active servers 12 in its database 66, by sending an SMS message to the server, or through any other suitable method.

As illustrated by line 84, if server 12 is active (e.g., server application 12 is active and data communications services 26 are maintaining an active IP link with network A over path 32), service portal 64 may perform the operations of step 94.

As illustrated by line 86, if server 12 (i.e., USER A1) is not active, service portal 64 may perform the operations of steps 88, 90, and 92 before performing the operations of step 94.

When a user in network B (i.e., user B1) requests service from an inactive server 12 in network A, service portal 12 may send an SMS address request to the device associated with the inactive server 12. If desired, service portal 12 may send an SMS address request using an approach of the type used by the requester in the steps of FIG. 2.

At step 90, SMS handler 30 may receive the address request from service portal 64 and pass the address request to service controller 18. The service controller 18 may generate and process a wake up command to activate server 12 and to direct data communications services 26 to establish an IP data link to network A (e.g., over path 32). Service controller 18 may then obtain the IP address of the IP data link from data communications services 26 and send a confirmation message that includes the IP address to service portal 64. The confirmation message may be sent in the form of an SMS message using SMS handler 30 or, if desired, using data communications services 26 and an associated IP link.

At step 92, service portal 64 may receive the confirmation message from server 12 and may establish a link with server 12 using the UP address in the confirmation message. If desired, service portal 64 may establish a bridge between server 12 and the requester (i.e., the device 72 in network B that initiated the service request in step 80).

At step 94, service portal 64 may obtain content desired by the user in network B from server 12 at device 10 and may provide the content to the requesting user in network B. With one suitable arrangement, service portal 64 can download files from server 12 using the IP link between server 1 and portal 64 and then forward the downloaded files to the requesting user over the IP link between portal 64 and user B1. With another suitable arrangement, service portal 64 can create a tunnel so that the requesting user's client application can connect to server 12 through the service portal and then access the services of server 12.

While server 12 has been described as being implemented on a cellular telephone, in general server 12 may be implemented on any suitable device such as a portable or handheld electronic device. For example, a server such as server 12 may be implemented on a laptop computer, a personal digital assistant (PDA), a tablet computer, etc.

The foregoing is merely illustrative of the principles of this invention and various modifications can be made by those skilled in the art without departing from the scope and spirit of the invention.

What is claimed is:

1. A method of using a service portal with computing equipment to facilitate communications with an electronic device that runs a server application on processing circuitry, wherein the electronic device transmits and receives wireless signals using a first communications path and a second communications path, wherein the server application provides services to client applications using the second communications path, and wherein communications between the server application and the client applications are routed through the service portal, the method comprising:

when the service portal receives a service request from one of the client applications, using the computing equipment of the service portal to check whether the server application on the electronic device is active or inactive;

when the server application is inactive, using the computing equipment of the service portal to send a request to the electronic device to activate the server application; and when the server application is active, using the computing equipment of the service portal to route communications between the server application and said one of the client applications.

2. The method defined in claim 1 wherein the first communication path comprises a short message service (SMS) communications path, wherein the second communications path comprises a wireless internet protocol (IP) communications path, wherein the server application shares files with the client applications, and wherein using the computing equipment of the service portal to route communications between the server application and said one of the client applications comprises:

using the computing equipment of the service portal, obtaining a file from the server application; and using the computing equipment of the service portal, forwarding the file to the client applications.

3. The method defined in claim 1 wherein the first communication path comprises a short message service (SMS) communications path, wherein the second communications path comprises a wireless internet protocol (IP) communications path, wherein the server application shares files with the client applications, and wherein using the computing equipment of the service portal to route communications between the server application and said one of the client applications comprises:

using the computing equipment of the service portal, creating a tunnel between said one of the client applications and the server application so that said one of the client applications can access the services provided by the server application.

* * * * *